United States Patent
Takatsu et al.

(10) Patent No.: US 8,088,708 B2
(45) Date of Patent: Jan. 3, 2012

(54) CATALYST PRECURSOR SUBSTANCE, AND CATALYST USING THE SAME

(75) Inventors: Kozo Takatsu, Chiba (JP); Yoshimi Kawashima, Chiba (JP); Satoshi Nakai, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 83 days.

(21) Appl. No.: 12/594,983
(22) PCT Filed: Apr. 2, 2008
(86) PCT No.: PCT/JP2008/056588
§ 371 (c)(1),
(2), (4) Date: Oct. 7, 2009
(87) PCT Pub. No.: WO2008/126743
PCT Pub. Date: Oct. 23, 2008

(65) Prior Publication Data
US 2010/0112397 A1  May 6, 2010

(30) Foreign Application Priority Data
Apr. 10, 2007  (JP) .................................. 2007-102898

(51) Int. Cl.
| | |
|---|---|
| B01J 23/00 | (2006.01) |
| B01J 23/60 | (2006.01) |
| B01J 23/72 | (2006.01) |
| B01J 23/02 | (2006.01) |
| B01J 23/06 | (2006.01) |
| B01J 23/70 | (2006.01) |
| H01M 8/22 | (2006.01) |
| H01M 8/06 | (2006.01) |
| C01B 31/20 | (2006.01) |
| C01B 3/16 | (2006.01) |
| C01B 3/18 | (2006.01) |
| C10G 25/00 | (2006.01) |
| C10G 45/04 | (2006.01) |
| C10G 45/60 | (2006.01) |
| C10G 29/00 | (2006.01) |

(52) U.S. Cl. ........ 502/342; 502/307; 502/318; 502/329; 502/331; 502/346; 429/420; 429/423; 429/425; 429/502; 429/505; 423/437.2; 423/656; 208/213; 208/248

(58) Field of Classification Search .................. 502/307, 502/318, 329, 331, 342, 346; 429/502, 505, 429/420, 423, 425; 423/437.2, 656
See application file for complete search history.

(56) References Cited

U.S. PATENT DOCUMENTS
4,522,938 A * 6/1985 Hoek et al. .................... 502/307
(Continued)

FOREIGN PATENT DOCUMENTS
EP  0 978 314  2/2000
(Continued)

OTHER PUBLICATIONS

Atake, Ikuo et al., "Cu/Zn/Al-kei Shokubai ni yoru CO Hensei Hanno—Hydrotalcite Zenkutai Chosei no Koka-", 99th Shokubai Toronkai Toronkai A Yokoshu, p. 19, Mar. 28, 2007.

(Continued)

*Primary Examiner* — Patricia L Hailey
(74) *Attorney, Agent, or Firm* — Oblon, Spivak, McClelland, Maier & Neustadt, L.L.P.

(57) ABSTRACT

The present invention provides a catalyst precursor substance containing copper, zinc, and aluminum and exhibiting an X-ray diffraction pattern having a broad peak at a specific interplanar spacing d (Å). The present invention also provides a method for producing the catalyst precursor substance by mixing a solution containing a copper salt, a zinc salt, and an aluminum salt with a solution containing an alkali metal hydroxide or an alkaline earth metal hydroxide, thereby forming a precipitate. In the present invention, a catalyst is prepared through calcining of the catalyst precursor; the catalyst is employed for water gas shift reaction; and carbon monoxide conversion is carried out by use of the catalyst. Thus, the present invention also provides a catalyst useful for water gas shift reaction, which exhibits high activity and durability and which, even when applied to a fuel cell, can be used for a long period of time with reduction in activity being suppressed; a carbon monoxide conversion method employing the catalyst; and a fuel cell system employing hydrogen produced through the carbon monoxide conversion method.

16 Claims, 3 Drawing Sheets

U.S. PATENT DOCUMENTS

| | | | |
|---|---|---|---|
| 4,835,132 A | 5/1989 | Sambrook | |
| 5,990,040 A * | 11/1999 | Hu et al. | 502/342 |
| 6,548,034 B2 * | 4/2003 | Takamura et al. | 423/247 |
| 6,627,572 B1 | 9/2003 | Cai et al. | |
| 7,025,947 B2 * | 4/2006 | Suzuki et al. | 423/652 |
| 7,659,227 B2 * | 2/2010 | Wolf | 502/304 |
| 7,776,785 B2 * | 8/2010 | Takatsu et al. | 502/343 |
| 2002/0051747 A1 | 5/2002 | Suzuki et al. | |
| 2002/0132155 A1 | 9/2002 | Shikada et al. | |
| 2003/0216255 A1 * | 11/2003 | Mascaros et al. | 502/342 |

FOREIGN PATENT DOCUMENTS

| | | |
|---|---|---|
| JP | 62 210057 | 9/1987 |
| JP | 9 187654 | 7/1997 |
| JP | 11 106770 | 4/1999 |
| JP | 2000 126597 | 5/2000 |
| JP | 2001 347169 | 12/2001 |
| JP | 2003 236382 | 8/2003 |
| JP | 2003-236382 * | 8/2003 |
| JP | 2004 122063 | 4/2004 |
| JP | 2004 202310 | 7/2004 |
| JP | 2004 298685 | 10/2004 |
| JP | 2008 044707 | 4/2008 |

OTHER PUBLICATIONS

Shishido, Tetsuya et al., "Water-gas shift reaction over Cu/ZnO and Cu/ZnO/$Al_2O_3$ catalysts prepared by homogeneous precipitation", Applied Catalysis A: General, vol. 303, p. 62-71, (2006).

Chinese Office Action issued Jul. 13, 2011, in China Patent Application 200880011259.9. (without English Translation).

* cited by examiner

CATALYST PRECURSOR SUBSTANCE, AND CATALYST USING THE SAME

This application is a 371 of PCT/JP2008/056588, filed Apr. 2, 2008.

TECHNICAL FIELD

The present invention relates to a catalyst precursor substance; to a method for producing the precursor substance; and to a copper-zinc-aluminum catalyst produced from the precursor substance. More particularly, the present invention relates to a catalyst precursor substance containing copper, zinc, and aluminum and exhibiting an X-ray diffraction pattern having a broad peak at a specific interplanar spacing d (Å); to a method for producing the precursor substance; and to a copper-zinc-aluminum catalyst; in particular, a copper-zinc-aluminum catalyst suitable as a catalyst for producing carbon dioxide and hydrogen through reaction between carbon monoxide and water vapor (hereinafter the catalyst may be referred to as a "catalyst for water gas shift reaction"), the catalyst being produced from the precursor substance. The present invention also relates to a conversion method by use of carbon monoxide (hereinafter the method may be referred to as a "carbon monoxide conversion method") in the presence of the copper-zinc-aluminum catalyst; and to a fuel cell system employing hydrogen produced through the carbon monoxide conversion method.

BACKGROUND ART

Copper-zinc-aluminum catalysts have been used for water gas shift reaction, methanol synthesis reaction, or production of an aldehyde or a ketone by alcohol dehydrogenation; or used as a hydrogenation catalyst or a desulfurization catalyst. However, copper-zinc-aluminum catalysts are likely to be impaired due to copper or zinc aggregation. Therefore, demand has arisen for improvement of durability of such catalysts.

As has been conventionally known, water gas shift reaction is an important reaction for removal of carbon monoxide upon production of hydrogen from a hydrocarbon, or for regulation of the ratio of hydrogen to carbon monoxide in methanol synthesis or oxo reaction. Recently, water gas shift reaction has become of interest as a reaction for producing, from a hydrocarbon or a similar material, hydrogen which is used for fuel cells and has a lowered carbon monoxide concentration.

Hitherto, iron-chromium catalysts have been developed for high-temperature water gas shift reaction, whereas copper-zinc-aluminum oxide catalysts have been developed for low-temperature water gas shift reaction. Various attempts have been made to improve the activity or durability of such a catalyst.

Specifically, Patent Document 1 discloses a catalyst for water gas shift reaction exhibiting good catalytic activity, the catalyst being prepared by introducing alumina or alumina gel (i.e., an alumina precursor) into a reaction system in advance, and forming copper and zinc precipitates around the alumina or alumina precursor serving as a nucleus. Patent Document 2 discloses a catalyst for CO shift reaction, which catalyst contains, as essential components, copper oxide, zinc oxide, aluminum oxide, zirconium oxide, and manganese oxide, and which exhibits a CO conversion higher than that of a conventional catalyst for low-temperature CO shift reaction containing copper/zinc/aluminum oxide. Patent Document 3 discloses a catalyst for low-temperature water gas shift reaction, which catalyst exhibits excellent activity and stability, which contains specific amounts of copper oxide, zinc oxide, and aluminum oxide, and which is produced from a precursor substance containing aluminum in the form of hydrotalcite and aluminum in a form different from hydrotalcite. Patent Document 4 discloses a method for synthesizing methanol by use of a copper-zinc catalyst produced from a catalyst precursor of aurichalcite-crystal-form ($(Cu, Zn)_5(CO_3)_2(OH)_6$). However, there has not yet been reported a methanol synthesis method by use of a copper-zinc-aluminum catalyst precursor exhibiting an X-ray diffraction pattern of spertiniite-crystal-form ($Cu(OH)_2$) or hydroscarbroite-crystal-form ($Al_{14}(CO_3)_3(OH)_{36} \cdot n(H_2O)$). Patent Document 5 discloses a carbon monoxide conversion catalyst exhibiting high activity at low temperature, which catalyst is prepared through a coprecipitation process in which an aqueous metal solution containing copper and zinc is mixed with a basic aqueous solution containing at least one of a primary amine, a secondary amine, and a tertiary amine. Patent Document 6 discloses a catalyst for carbon monoxide conversion, which catalyst can maintain high carbon monoxide conversion over a long period of time at a relatively low temperature, and which is produced through calcining of a composition containing specific amounts of copper oxide, zinc oxide, and silicon oxide.

However, none of the above-disclosed catalysts is satisfactory as a catalyst for water gas shift reaction for producing hydrogen used in a fuel cell, which is turned on and off frequently and repeatedly.

Patent Document 1: Japanese Patent Application Laid-Open (kokai) No. 2003-236382
Patent Document 2: Japanese Patent Application Laid-Open (kokai) No. 2004-122063
Patent Document 3: Japanese Patent Application Laid-Open (kokai) No. 2005-520689
Patent Document 4: Japanese Patent Application Laid-Open (kokai) No. H09-187654
Patent Document 5: Japanese Patent Application Laid-Open (kokai) No. 2004-298685
Patent Document 6: Japanese Patent Application Laid-Open (kokai) No. 2000-126597

DISCLOSURE OF THE INVENTION

Problems to be Solved by the Invention

In view of the foregoing, an object of the present invention is to provide a catalyst precursor substance containing copper, zinc, and aluminum and exhibiting a characteristic X-ray diffraction pattern. Another object of the present invention is to provide a method for producing the catalyst precursor substance. Yet another object of the present invention is to provide a copper-zinc-aluminum catalyst which is produced through calcining of the catalyst precursor, and is employed as a catalyst for steam reforming of methanol, a catalyst for methanol synthesis, or a desulfurization catalyst. Yet another object of the present invention is to provide a copper-zinc-aluminum catalyst produced through calcining of the catalyst precursor and employed as a catalyst for water gas shift reaction, which exhibits high activity and durability and which, even when applied to a fuel cell, can be used for a long period of time with reduction in activity being suppressed. Yet another object of the present invention is to provide a carbon monoxide conversion method employing the copper-zinc-aluminum catalyst. Yet another object of the present invention is to provide a fuel cell system employing hydrogen produced through the carbon monoxide conversion method.

Means for Solving the Problems

In order to achieve the aforementioned objects, the present inventors have conducted extensive studies, and as a result have found that a catalyst produced through calcining of a catalyst precursor substance containing copper, zinc, and aluminum and exhibiting a novel X-ray diffraction pattern can be employed as a catalyst for steam reforming of methanol, a catalyst for methanol synthesis, a desulfurization catalyst, or a catalyst for water gas shift reaction, which exhibits high activity and durability and which, even when applied to a fuel cell, can be used for a long period of time with reduction in activity being suppressed. The present invention has been accomplished on the basis of this finding.

Accordingly, the present invention provides:

(1) a catalyst precursor substance characterized by containing copper, zinc, and aluminum and exhibiting an X-ray diffraction pattern having broad peaks at interplanar spacings d (Å) of 5.0±0.5 Å, 3.7±0.3 Å, 2.6±0.2 Å, 2.3±0.2 Å, and 1.7±0.1 Å;

(2) the catalyst precursor substance as described in (1) above, wherein the X-ray diffraction pattern further has broad peaks at interplanar spacings d (Å) of 8.4±0.6 Å and 4.2±0.3 Å;

(3) the catalyst precursor substance as described in (1) or (2) above, which further contains at least one of the elements belonging to Groups 2 to 14 of the periodic table;

(4) a method for producing a catalyst precursor substance as recited in any of (1) to (3) above, characterized by comprising mixing a solution containing a copper salt, a zinc salt, and an aluminum salt with a solution containing an alkali metal hydroxide or an alkaline earth metal hydroxide and having a pH of 8 to 11.5, to thereby form a precipitate;

(5) the method for producing a catalyst precursor substance as described in (4) above, wherein, in the solution containing a copper salt, a zinc salt, and an aluminum salt, the atomic ratio Cu/(Cu+Zn+Al) is 0.1 to 0.9, the atomic ratio Zn/Cu is 0.05 to 1.0, and the atomic ratio Zn/Al is 0.05 to 1.5;

(6) the method for producing a catalyst precursor substance as described in (5) above, wherein, in the solution containing a copper salt, a zinc salt, and an aluminum salt, the atomic ratio Cu/(Cu+Zn+Al) is 0.2 to 0.9, the atomic ratio Zn/Cu is 0.1 to 0.9, and the atomic ratio Zn/Al is 0.1 to 1.0;

(7) the method for producing a catalyst precursor as described in any of (4) to (6) above, wherein the alkali metal hydroxide is sodium hydroxide;

(8) a copper-zinc-aluminum catalyst produced through calcining of a catalyst precursor substance as recited in any of (1) to (3) above;

(9) a copper-zinc-aluminum catalyst produced through calcining, at 200° C. to 600° C., of a catalyst precursor substance as recited in any of (1) to (3) above;

(10) the copper-zinc-aluminum catalyst as described in (8) or (9) above, which has a specific surface area of 50 to 500 m²/g, wherein, when the total amount of catalyst components is 100 mass %, the amount of copper oxide component is 10 to 90 mass %, the amount of zinc oxide component is 5 to 60 mass %, and the amount of aluminum oxide component is 5 to 60 mass %;

(11) the copper-zinc-aluminum catalyst as described in (8) or (9) above, which has a specific surface area of 100 to 200 m²/g, a copper surface area of 20 m²/g or more, a carbon monoxide adsorption amount of 20 to 100 μmol/g, and a CuO crystallite size of 150 Å or less, wherein, when the total amount of catalyst components is 100 mass %, the amount of copper oxide component is 30 to 90 mass %, the amount of zinc oxide component is 5 to 40 mass %, and the amount of aluminum oxide component is 5 to 40 mass %;

(12) the copper-zinc-aluminum catalyst as described in any of (8) to (11) above, which is a catalyst for water gas shift reaction;

(13) the copper-zinc-aluminum catalyst as described in any of (8) to (11) above, which is a catalyst for steam reforming of methanol, a catalyst for methanol synthesis, or a desulfurization catalyst;

(14) a carbon monoxide conversion method characterized by comprising reducing the carbon monoxide concentration of a hydrogen-containing gas containing carbon monoxide through water gas shift reaction at 150 to 400° C. by use of a copper-zinc-aluminum catalyst as recited in (12) above;

(15) a fuel cell system characterized by employing hydrogen produced through a carbon monoxide conversion method as recited in (14) above;

(16) a fuel cell system as described in (15) above, which employs hydrogen produced by conversion, through a carbon monoxide conversion method as recited in (14) above, of carbon monoxide contained in a gas mixture containing hydrogen obtained through reforming of a hydrocarbon fuel; and (17) the fuel cell system as described in (16) above, wherein the hydrocarbon fuel is LPG, city gas, natural gas, naphtha, kerosene, or light oil.

DESCRIPTION OF REFERENCE NUMERALS

1: Fuel cell system
11: Water feed pipe
12: Fuel feed pipe
20: Hydrogen production system
21: Fuel tank
22: Regulator
23: Desulfurizer
24: Water pump
31: Reformer
31A: Burner
32: CO converter charged with the copper-zinc-aluminum catalyst of the present invention
33: CO preferential oxidation reactor
34: Fuel cell
34A: Negative electrode
34B: Positive electrode
34C: Polymer electrolyte
35: Air blower
36: Gas-water separator
37: Exhaust heat recovery apparatus
37A: Heat exchanger
37B: Heat exchanger 37C: Condenser
37D: (Circulation) pump

BEST MODES FOR CARRYING OUT THE INVENTION

The catalyst precursor substance of the present invention is a substance containing copper, zinc, and aluminum and exhibiting an X-ray diffraction pattern similar to that of spertiniite ($Cu(OH)_2$), the X-ray diffraction pattern having broad peaks at interplanar spacings d (Å) of 5.0±0.5 Å, 3.7±0.3 Å, 2.6±0.2 Å, 2.3±0.2 Å, and 1.7±0.1 Å.

The catalyst precursor substance of the present invention may be a substance containing copper, zinc, and aluminum and exhibiting an X-ray diffraction pattern having, in addition to the aforementioned peaks, broad peaks at interplanar spacings d (Å) of 8.4±0.6 Å and 4.2±0.3 Å. The X-ray diffraction pattern having peaks at interplanar spacings d (Å) of 8.4±0.6 Å and 4.2±0.3 Å is similar to that of hydroscarbroite ($Al_{14}(CO_3)_3(OH)_{36} \cdot n(H_2O)$).

The catalyst precursor substance of the present invention may contain a substance exhibiting, in addition to the aforementioned two X-ray diffraction patterns, the X-ray diffraction pattern of tenorite (CuO) (interplanar spacing: 2.3±0.2 Å and 2.57±0.2 Å). When such a substance is contained in a small amount, the substance causes no problem for the catalytic performance of the catalyst precursor substance.

In the present invention, X-ray diffraction pattern is determined under the following conditions.

Cu—Kα ray: wavelength λ=1.5406 Å, output: 40 kV, 40 mA, optical system: reflection method; 2θ·θ continuous scan, DS, SS slit: 1°, RS slit: 0.3 mm, step interval: 0.02°, scan rate: 1°/minute The aforementioned catalyst precursor substance may be produced through, for example, the following procedure: a solution containing a copper salt, a zinc salt, and an aluminum salt in which the atomic ratio Cu/(Cu+Zn+Al) is 0.20 to 0.90, the atomic ratio Zn/(Cu+Zn+Al) is 0.01 to 0.40, and the atomic ratio Al/(Cu+Zn+Al) is 0.10 to 0.60, preferably Cu/(Cu+Zn+Al) is 0.2 to 0.9, Zn/Cu is 0.1 to 0.9, and Zn/Al is 0.1 to 1.0, is mixed with a solution containing sodium hydroxide (precipitant), and the thus-formed precipitate is washed and dried. In the case where a solution containing a copper salt, a zinc salt, and an aluminum salt is mixed with a sodium hydroxide solution, to thereby coprecipitate copper, zinc, and aluminum, one of these solutions may be stirred while the other solution is mixed therewith. In this case, preferably, these solutions are mixed so that the resultant mixture has a pH of 8 to 11.5. Alternatively, a solution containing a copper salt, a zinc salt, and an aluminum salt and a sodium hydroxide solution may be mixed together by simultaneously supplying these solutions by means of, for example, a pump. Preferably, this mixing is carried out so that the resultant mixture maintains a pH of 8.0 to 11.5.

The precipitant employed in the present invention is an alkali metal hydroxide or an alkaline earth metal hydroxide. Sodium hydroxide, potassium hydroxide, and barium hydroxide are preferred, with sodium hydroxide being most preferred. When an alkali metal carbonate (e.g., sodium carbonate) or an alkaline earth metal carbonate is employed, the catalyst precursor substance of the present invention fails to be obtained.

The copper salt or zinc salt employed may be in the form of, for example, nitrate, chloride, sulfate, hydrochloride, or organic acid salt (e.g., acetate or citrate). Of these, nitrate is preferred. The aluminum salt employed may be in the form of, for example, nitrate, chloride, hydrochloride, sulfate, hydroxide, sodium aluminate, or pseudoboehmite. Of these, nitrate or sodium aluminate is preferred.

A solution containing a copper salt, a zinc salt, and an aluminum salt is mixed with a solution containing an alkali metal hydroxide (e.g., sodium hydroxide) or an alkaline earth metal hydroxide under stirring at about 0° C. to about 90° C. Washing and filtration may be carried out immediately after formation of a precipitate or after aging.

No particular limitation is imposed on the conditions for drying the resultant precipitate, and drying may be carried out and completed at room temperature to about 200° C.

The copper-zinc-aluminum catalyst of the present invention can be produced through calcining of the aforementioned catalyst precursor substance at about 200° C. to about 600° C. The catalyst produced through calcining does not exhibit the X-ray diffraction pattern of the catalyst precursor, but exhibits the X-ray diffraction pattern of copper oxide. The X-ray diffraction pattern of the catalyst may include the X-ray diffraction pattern of zinc oxide, which is contained in the catalyst in a small amount. The thus-produced catalyst is employed as is, or granulated or tableted through an appropriate method. The particle size or form of the catalyst may be determined as desired in consideration of the reaction system employed or the form of a reactor employed. The catalyst of the present invention may be employed in any reaction system (e.g., a fixed bed or fluidized bed reaction system).

In the copper-zinc-aluminum catalyst of the present invention, the amount of the copper component is preferably 10 to 90 mass % (more preferably 30 to 90 mass %) in terms of copper oxide, the amount of the zinc component is preferably 5 to 60 mass % (more preferably 5 to 40 mass %) in terms of zinc oxide, and the amount of the aluminum component is preferably 5 to 60 mass % (more preferably 5 to 40 mass %) in terms of aluminum oxide.

The copper-zinc-aluminum catalyst of the present invention preferably has a specific surface area of 50 to 500 m$^2$/g, more preferably 100 to 200 m$^2$/g.

The copper-zinc-aluminum catalyst of the present invention preferably has a copper surface area of 20 m$^2$/g or more, a carbon monoxide adsorption amount of 20 to 100 μmol/g, and a CuO crystallite size of 150 Å or less.

In the present invention, specific surface area was determined as follows by means of a specific surface area measuring apparatus (manufactured by YUASA-IONICS CO. LTD.). A sample (about 100 mg) was charged into a sample tube and subjected to a preliminary treatment. Specifically, the sample was heated and dehydrated at 200° C. for 20 minutes under a stream of nitrogen. Subsequently, a gas mixture of nitrogen (30%) and helium (70%) was caused to pass through the sample tube at a temperature of liquid nitrogen, to thereby cause nitrogen to be adsorbed on the sample and then desorbed therefrom. The specific surface area of the sample was determined on the basis of the amount of adsorbed nitrogen as measured by means of a TCD detector.

For the determination of the copper surface area of the catalyst, the catalyst was subjected to reduction treatment with hydrogen gas for 120 minutes by means of a differential thermal balance (manufactured by Bruker AXS K.K.). Thereafter, He was caused to pass through the catalyst at 90° C. for 60 minutes, and then a gas mixture of nitrous oxide (1%) and helium (99%) was caused to pass through the catalyst at 90° C., to thereby oxidize copper on the surface of the catalyst as shown in the following reaction formula.

$$N_2O + 2Cu \rightarrow N_2 + Cu_2O$$

The number of copper atoms on the catalyst surface was calculated on the basis of a change in weight of the catalyst in accordance with oxidation of Cu to $Cu_2O$ form, and the copper surface area of the catalyst was calculated on the basis of the finding that the number of copper atoms present in a catalyst area of 1 $m^2$ was $1.46\times10^{19}$.

CO adsorption amount was determined through the pulse method by means of a pulse-type gas adsorption amount measuring apparatus (R6015, manufactured by OHKURA RIKEN CO. LTD.). A sample (about 200 mg) was weighed and pretreated; specifically, the sample was subjected to reduction treatment with 100% hydrogen at 200° C. for 60 minutes. Thereafter, the sample was purged with He at 200° C. for 60 minutes. For the determination of CO adsorption amount, CO gas was pulsed into the sample at 50° C. Pulsing of CO gas was continued until no further adsorption of CO was observed, followed by determination of CO adsorption amount.

For the determination of CuO crystallite size, the catalyst produced through calcining was subjected to XRD analysis (X-ray source: Cu—Kα (1.5406 Å, monochromated by a graphite monochromator), 2θ-θ reflection). CuO crystallite size was calculated on the basis of the peak at 2θ of 38.3° by use of the Scherrer equation.

The copper-zinc-aluminum catalyst of the present invention is useful as a catalyst for steam reforming of methanol, a catalyst for methanol synthesis, a desulfurization catalyst, or a catalyst for water gas shift reaction; in particular, as a catalyst for water gas shift reaction.

When carbon monoxide conversion is carried out through water gas shift reaction by use of the copper-zinc-aluminum catalyst of the present invention, conditions therefor may vary with, for example, the carbon monoxide or hydrogen concentration of a raw material gas, or the amount of catalyst component. Generally, carbon monoxide conversion is carried out under the following appropriate conditions: reaction temperature: about 150° C. to about 400° C., reaction pressure: ambient pressure to about 10 MPa (absolute pressure), ratio by mole of water vapor to carbon monoxide contained in a raw material gas: about 1 to about 100, space velocity (GHSV) of a raw material gas (exclusive of water vapor): about 100 to about 100,000 $hr^{-1}$.

Figure 5:
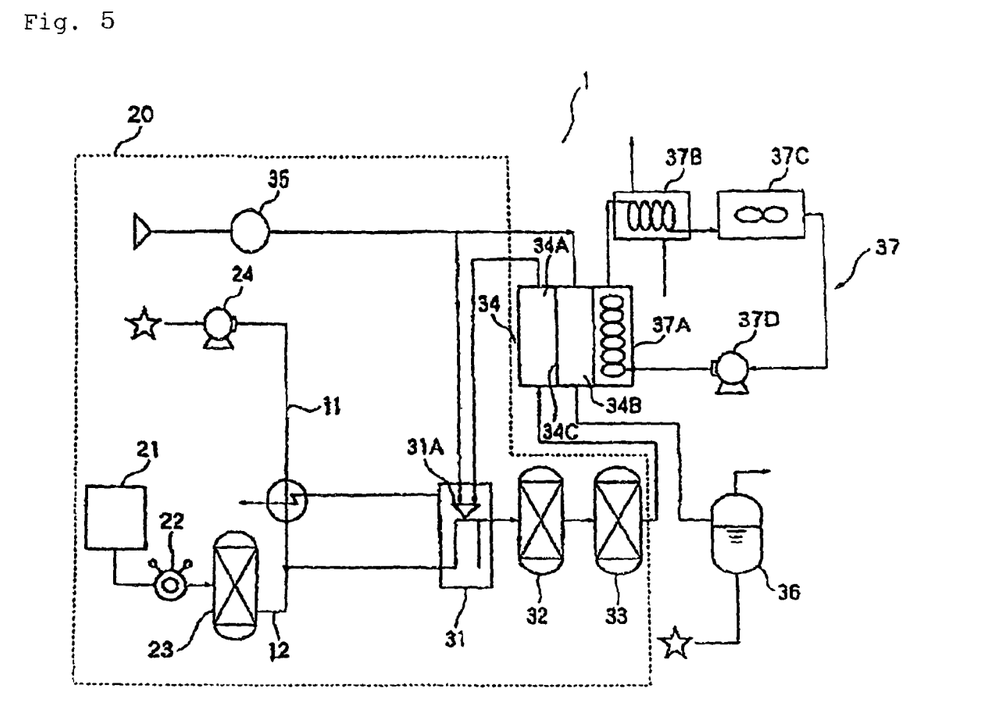
FIG. 5 schematically shows an embodiment of a fuel cell system including a CO converter charged with the copper-zinc-aluminum catalyst of the present invention.

FIG. 5 schematically shows an embodiment of a fuel cell system including a CO converter charged with the copper-zinc-aluminum catalyst of the present invention. The fuel cell system of the present invention will next be described with reference to FIG. 5 (accompanying drawing).

In this embodiment, the fuel cell system is applied to a polymer electrolyte fuel cell. However, the fuel cell system may also be applied to another type of fuel cell (e.g., a solid oxide fuel cell).

As shown in FIG. 5, a hydrocarbon compound contained in a fuel tank 21 is, if necessary, depressurized by means of a regulator 22, and then is fed into a desulfurizer 23. The desulfurizer is charged with a desulfurizing agent. The hydrocarbon compound which has undergone desulfurization in the desulfurizer 23 is mixed with water which has been fed from a water tank through a water pump 24. The resultant mixture is fed into a reformer 31 after vaporization of water.

The reformer 31 is charged with a hydrocarbon reforming catalyst (e.g., a ruthenium/alumina catalyst). The hydrocarbon-compound-containing mixture (i.e., mixture of water vapor, oxygen, and the hydrocarbon compound) is introduced into the reformer 31 and subjected to reforming reaction (e.g., steam reforming or autothermal reforming), to thereby produce hydrogen gas.

The thus-produced hydrogen gas is introduced into a CO converter 32 charged with the copper-zinc-aluminum catalyst of the present invention for further reducing the CO concentration of the hydrogen gas and improving hydrogen yield. In addition, the hydrogen gas is caused to pass through a CO preferential oxidation reactor 33 for reducing the CO concentration of the hydrogen gas to such a level that does not affect properties of a fuel cell. The CO preferential oxidation reactor 33 is charged with, for example, a ruthenium catalyst, a platinum catalyst, or a mixture thereof.

A polymer electrolyte fuel cell 34 includes a negative electrode 34A, a positive electrode 34B, and a polymer electrolyte 34C provided between these electrodes. The above-produced hydrogen gas, and air fed from an air blower 35 are supplied to the negative electrode and the positive electrode, respectively. If necessary, the hydrogen gas and the air are subjected to appropriate humidification treatment (no humidifier is illustrated) before supply to the electrodes.

In the negative electrode, the hydrogen gas is converted into protons, and electrons are released, whereas in the positive electrode, oxygen gas, the thus-released electrons, and protons together form water. Through these reactions, direct current flows between the electrodes 34A and 34B. The negative electrode is formed of, for example, platinum black, a Pt-on-activated carbon catalyst, or a Pt—Ru alloy catalyst. The positive electrode is formed of, for example, platinum black or a Pt-on-activated carbon catalyst.

A burner 31A of the reformer 31 may be connected to the negative electrode 34A for employing excess hydrogen as a fuel. A gas-water separator 36 connected to the positive electrode 34B is employed for separation of exhaust gas and water formed through bonding between hydrogen and oxygen contained in the air supplied to the positive electrode 34B. The thus-separated water may be employed for water vapor production.

An exhaust heat recovery apparatus 37 may be provided on the fuel cell 34 for recovery and effective utilization of heat generated in the fuel cell in association with electric power generation. The exhaust heat recovery apparatus 37 includes a heat exchanger 37A for recovering heat generated during the course of reaction; a heat exchanger 37B for transferring the heat recovered by the heat exchanger 37A to water; a condenser 37C; and a pump 37D for circulating a cooling medium through the heat exchangers 37A and 37B and the condenser 37C. Hot water obtained in the heat exchanger 37B may be effectively employed in, for example, equipment other than the fuel cell system.

EXAMPLES

The present invention will next be described in more detail by way of examples, which should not be construed as limiting the invention thereto.

In each of the below-described Examples, a catalyst precursor and a copper-zinc-aluminum catalyst were subjected to X-ray diffractometry under the aforementioned conditions, and the specific surface area, copper surface area, carbon monoxide adsorption amount, and CuO crystallite size of the catalyst were determined through the aforementioned methods.

Example 1

Copper nitrate trihydrate (9.4 g), zinc nitrate hexahydrate (3.7 g), and aluminum nitrate nonahydrate (11.0 g) were dissolved in water (100 mL), to thereby prepare a solution (hereinafter will be referred to as "solution A"). Separately, a 2-mol/L sodium hydroxide solution was prepared. Solution A and the sodium hydroxide solution were simultaneously added dropwise to a container containing water (50 mL, 50°

Figure 1:
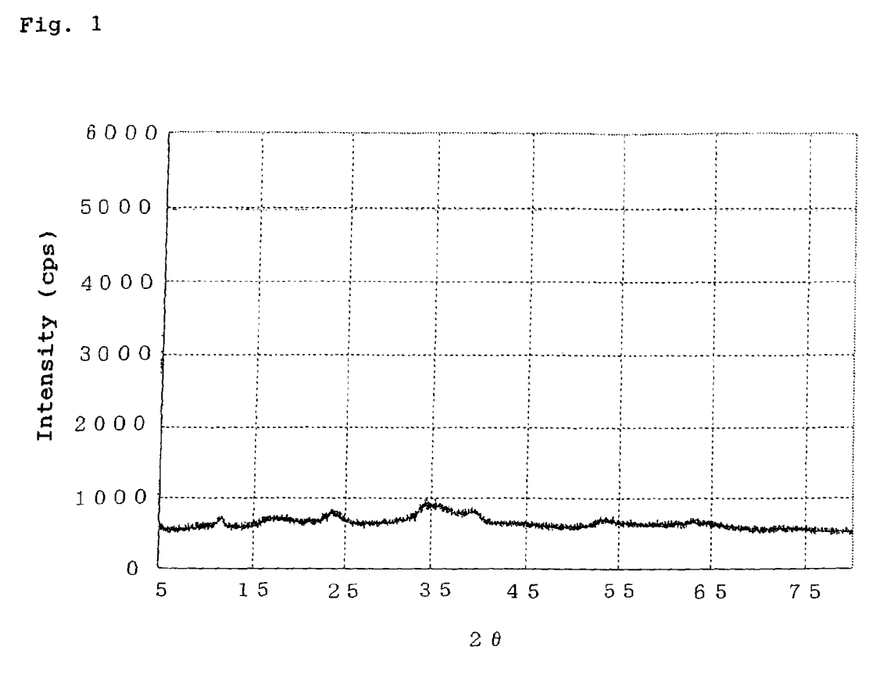
FIG. 1 shows the X-ray diffraction pattern of a catalyst precursor produced in Example 1.
Figure 2:
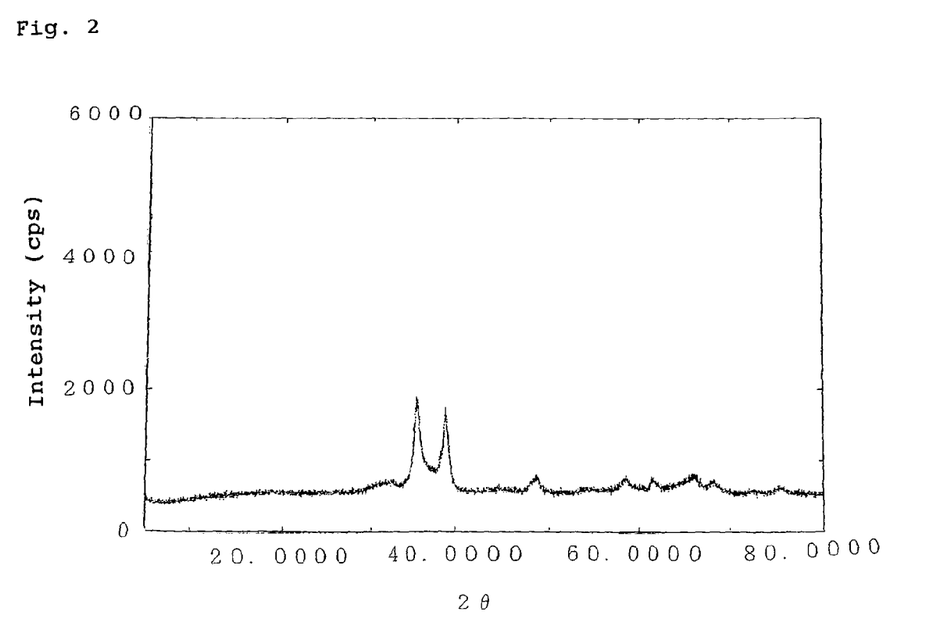
FIG. 2 shows the X-ray diffraction pattern of a catalyst produced in Example 1.

C.). During dropwise addition, the temperature of a mixture was maintained at 50° C. while the resultant precipitate was stirred, and the dropwise addition rate of the sodium hydroxide solution was regulated so that the pH of the mixture was 9.5 to 10.0. After aging of the resultant precipitate for three hours, the precipitate was filtered and thoroughly washed with water. The thus-recovered precipitate was dried at 120° C. and then subjected to X-ray diffractometry. The thus-dried product exhibited broad peaks at interplanar spacings d (Å) of 5.07 Å, 3.70 Å, 2.61 Å, 2.27 Å, and 1.71 Å. The dried product also exhibited a small peak (at 7.49 Å) attributed to incorporation of a small amount of hydrotalcite, and a peak (at 2.52 Å) attributed to a small amount of copper oxide. FIG. 1 shows the X-ray diffraction pattern of this product. This dried product (catalyst precursor) was calcined at 350° C. for three hours, to thereby yield a catalyst. FIG. 2 shows the X-ray diffraction pattern of the catalyst obtained through calcining. The catalyst was found to contain copper oxide in an amount of 54.7 mass %, zinc oxide in an amount of 19.4 mass %, and aluminum oxide in an amount of 25.9 mass %. The catalyst was subjected to compression molding and then ground into particles having a size of 0.5 to 1 mm.

Example 2

Figure 3:
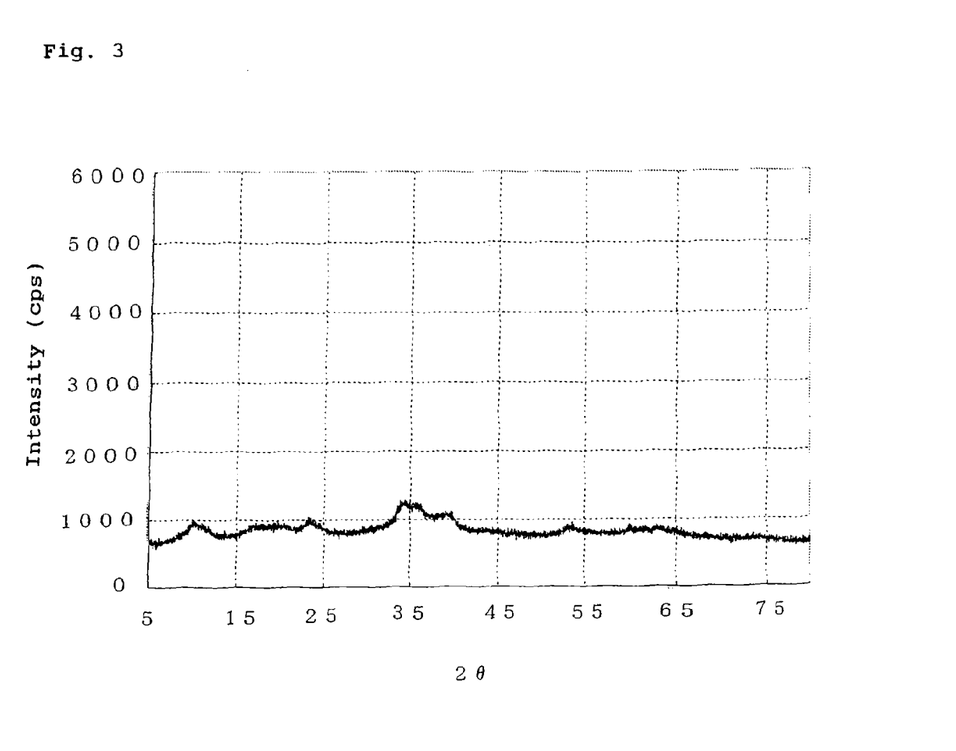
FIG. 3 shows the X-ray diffraction pattern of a catalyst precursor produced in Example 2.

The procedure of Example 1 was repeated, except that the pH of a precipitate mixture was maintained at 9.0 to 9.5, to thereby prepare a catalyst precursor. The catalyst precursor exhibited broad peaks at interplanar spacings d (Å) of 8.84 Å, 5.15 Å, 4.33 Å, 3.72 Å, 2.60 Å, 2.29 Å, and 1.71 Å. The catalyst precursor also exhibited a peak (at d=2.52 Å) attributed to a small amount of copper oxide. FIG. 3 shows the X-ray diffraction pattern of the catalyst precursor. The catalyst precursor (dried product) was calcined at 350° C. for three hours, to thereby yield a catalyst. The catalyst obtained through calcining was found to contain copper oxide in an amount of 56.0 mass %, zinc oxide in an amount of 18.3 mass %, and aluminum oxide in an amount of 25.7 mass %. The catalyst obtained through calcining exhibited an X-ray diffraction pattern similar to that of the catalyst of Example 1.

Example 3

The procedure of Example 1 was repeated, except that copper nitrate trihydrate (9.5 g), zinc nitrate hexahydrate (1.8 g), and aluminum nitrate nonahydrate (14.7 g) were employed, and that the pH of a precipitate mixture was maintained at 8.5 to 9.0, to thereby prepare a catalyst precursor. The catalyst precursor exhibited an X-ray diffraction pattern similar to that of the catalyst precursor of Example 2. A catalyst obtained through calcining of the catalyst precursor was found to contain copper oxide in an amount of 55.7 mass %, zinc oxide in an amount of 9.9 mass %, and aluminum oxide in an amount of 34.4 mass %. The catalyst obtained through calcining exhibited an X-ray diffraction pattern similar to that of the catalyst of Example 1.

Example 4

The procedure of Example 1 was repeated, except that copper nitrate trihydrate (11.4 g), zinc nitrate hexahydrate (2.9 g), and aluminum nitrate nonahydrate (8.8 g) were employed, and that the pH of a precipitate mixture was maintained at 9.5 to 10.0, to thereby prepare a catalyst precursor. The catalyst precursor exhibited an X-ray diffraction pattern similar to that of the catalyst precursor of Example 2. A catalyst obtained through calcining of the catalyst precursor was found to contain copper oxide in an amount of 66.4 mass %, zinc oxide in an amount of 14.2 mass %, and aluminum oxide in an amount of 19.4 mass %. The catalyst obtained through calcining exhibited an X-ray diffraction pattern similar to that of the catalyst of Example 1.

Example 5

The procedure of Example 1 was repeated, except that copper nitrate trihydrate (5.7 g), zinc nitrate hexahydrate (5.1 g), and aluminum nitrate nonahydrate (15.5 g) were employed, and that the pH of a precipitate mixture was maintained at 9.0 to 9.5, to thereby prepare a catalyst precursor. The catalyst precursor exhibited an X-ray diffraction pattern similar to that of the catalyst precursor of Example 2. A catalyst obtained through calcining of the catalyst precursor was found to contain copper oxide in an amount of 35.0 mass %, zinc oxide in an amount of 27.2 mass %, and aluminum oxide in an amount of 37.8 mass %. The catalyst obtained through calcining exhibited an X-ray diffraction pattern similar to that of the catalyst of Example 1.

Example 6

The procedure of Example 1 was repeated, except that copper nitrate trihydrate (9.6 g), zinc nitrate hexahydrate (3.7 g), aluminum nitrate nonahydrate (9.4 g), and zirconium oxynitrate dihydrate (0.5 g) were employed, and that the pH of a precipitate mixture was maintained at 8.0 to 8.5, to thereby prepare a catalyst precursor. The catalyst precursor exhibited an X-ray diffraction pattern similar to that of the catalyst precursor of Example 2. A catalyst obtained through calcining of the catalyst precursor was found to contain copper oxide in an amount of 54.3 mass %, zinc oxide in an amount of 16.3 mass %, aluminum oxide in an amount of 25.6 mass %, and zirconium oxide in an amount of 3.8 mass %.

Example 7

The procedure of Example 1 was repeated, except that copper nitrate trihydrate (9.1 g), zinc nitrate hexahydrate (3.5 g), aluminum nitrate nonahydrate (10.8 g), and magnesium nitrate hexahydrate (1.6 g) were employed, and that the pH of a precipitate mixture was maintained at 9.0 to 9.5, to thereby prepare a catalyst precursor. The catalyst precursor exhibited an X-ray diffraction pattern similar to that of the catalyst precursor of Example 2. A catalyst obtained through calcining of the catalyst precursor was found to contain copper oxide in an amount of 55.1 mass %, zinc oxide in an amount of 16.4 mass %, aluminum oxide in an amount of 25.9 mass %, and magnesium oxide in an amount of 2.6 mass %.

Comparative Example 1

The procedure of Example 1 was repeated, except that copper nitrate trihydrate (9.5 g) and zinc nitrate hexahydrate (9.1 g) were employed, and that the pH of a precipitate mixture was maintained at 9.5 to 10.0, to thereby prepare a catalyst precursor. The catalyst precursor exhibited sharp peaks at interplanar spacings d (Å) of 2.82 Å, 2.61 Å, 2.52 Å, 2.48 Å, 2.32 Å, 1.91 Å, 1.88 Å, and 1.62 Å, whereby formation of CuO and ZnO was confirmed. The catalyst precursor (dried product) was calcined at 350° C. for three hours, to thereby yield a catalyst. The catalyst obtained through calcining was found to contain copper oxide in an amount of 54.7 mass % and zinc oxide in an amount of 45.3 mass %.

Comparative Example 2

The procedure of Example 1 was repeated, except that the pH of a precipitate mixture was maintained at 5.5 to 6.0, to thereby prepare a catalyst precursor. The catalyst precursor exhibited peaks at interplanar spacings d (Å) of 8.73 Å, 6.90 Å, 4.32 Å, 3.45 Å, 2.76 Å, 2.63 Å, 2.61 Å, 2.08 Å, and 1.71 Å, whereby formation of hydroscarbroite and $Cu_2(OH)_3NO_3$ (gerhardtite) was confirmed. The catalyst precursor was calcined in a manner similar to that described in Example 1, to thereby yield a catalyst. The catalyst obtained through calcining was found to contain copper oxide in an amount of 57.3 mass %, zinc oxide in an amount of 15.8 mass %, and aluminum oxide in an amount of 26.7 mass %.

Comparative Example 3

Figure 4:
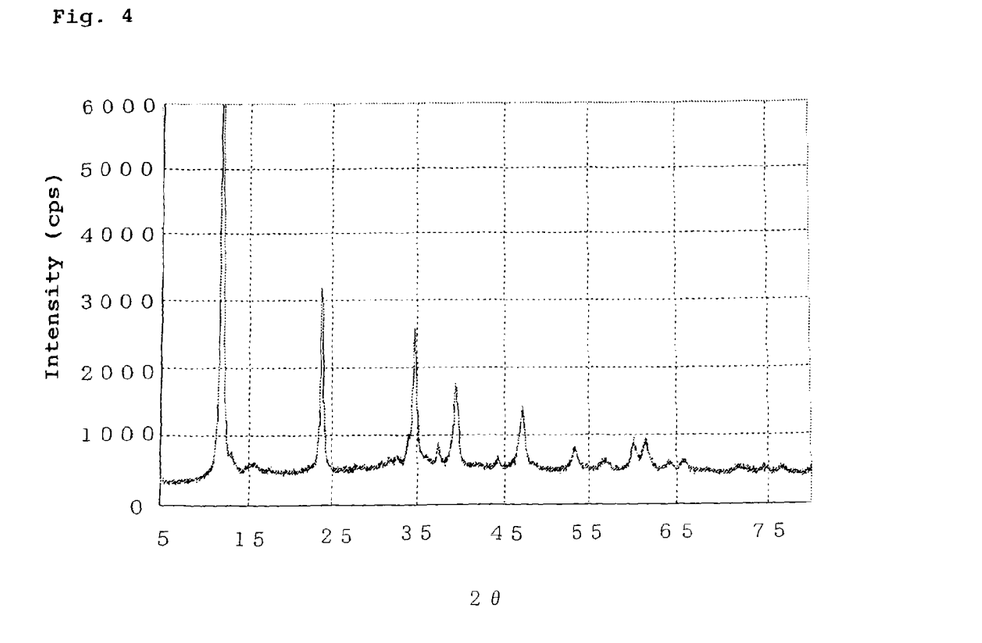
FIG. 4 shows the X-ray diffraction pattern of a catalyst precursor produced in Comparative Example 3.

The procedure of Example 1 was repeated, except that copper nitrate trihydrate (4.8 g), zinc nitrate hexahydrate (6.9 g), and aluminum nitrate nonahydrate (8.6 g) were employed, that the 2-mol/L sodium hydroxide solution was replaced with a 1-mol/L sodium carbonate solution, and that the pH of a precipitate mixture was maintained at 7.5 to 8.0, to thereby prepare a catalyst precursor. The catalyst precursor exhibited peaks at interplanar spacings d (Å) of 7.49 Å, 3.74 Å, 2.58 Å, 2.39 Å, 2.28 Å, 2.05 Å, 1.93 Å, 1.71 Å, and 1.63 Å; i.e., the catalyst precursor exhibited the X-ray diffraction pattern of hydrotalcite. FIG. 4 shows the X-ray diffraction pattern of the catalyst precursor. A catalyst obtained through calcining of the catalyst precursor was found to contain copper oxide in an amount of 35.2 mass %, zinc oxide in an amount of 38.5 mass %, and aluminum oxide in an amount of 25.2 mass %.

Comparative Example 4

The procedure of Example 1 was repeated, except that the 2-mol/L sodium hydroxide solution was replaced with a 1-mol/L sodium carbonate solution, and that the pH of a precipitate mixture was maintained at 6.0 to 6.5, to thereby prepare a catalyst precursor. The catalyst precursor exhibited peaks at interplanar spacings d (Å) of 7.52 Å, 5.96 Å, 5.04 Å, 3.74 Å, 2.81 Å, 2.52 Å, 2.24 Å, and 2.05 Å, formation of hydrotalcite and rosasite as main products was confirmed. A catalyst obtained through calcining of the catalyst precursor was found to contain copper oxide in an amount of 56.6 mass %, zinc oxide in an amount of 16.4 mass %, and aluminum oxide in an amount of 26.9 mass %.

Comparative Example 5

The procedure of Example 7 was repeated, except that the 2 mol/L sodium hydroxide solution was replaced with a 1 µmol/L sodium carbonate solution, and that the pH of a precipitate mixture was maintained at 8.0 to 8.5, to thereby prepare a catalyst precursor. The catalyst precursor exhibited the X-ray diffraction pattern of hydrotalcite. A catalyst obtained through calcining of the catalyst precursor was found to contain copper oxide in an amount of 56.3 mass %, zinc oxide in an amount of 15.5 mass %, aluminum oxide in an amount of 27.0 mass %, and magnesium oxide in an amount of 1.2 mass %.

Catalyst Evaluation Method

<Evaluation of Catalyst Activity>

SiC (4 mL) was added to each of the catalysts produced in the Examples and Comparative Examples (particle size adjusted to 0.5 to 1 mm) (0.5 mL), and the resultant mixture was charged into a reaction pipe having an inner diameter of 12 mm. The catalyst was subjected to reduction treatment in the reaction pipe at 230° C. for two hours under a stream of $H_2/N_2$ (20%/80%). Thereafter, a gas mixture of $H_2/CO/CO_2/H_2O$ (49.9 vol. %/9.9 vol. %/10.2 vol. %/30.0 vol. %) was introduced into the reaction pipe at a GHSV of 60,000 $hr^{-1}$, and CO conversion was carried out at 200° C. The resultant gas was sampled, and the CO concentration of the gas was determined by means of gas chromatography. CO conversion was determined on the basis of the thus-obtained data by use of the following formula. The results are shown in Table 1.

$$CO\ conversion(\%) = ((A-B)/A) \times 100$$

[In this formula, A represents the amount of CO at the inlet of the reaction pipe (i.e., CO concentration (vol. %) before conversion×gas amount (mL/min) before conversion); and B represents the amount of CO at the outlet of the reaction pipe (i.e., CO concentration (vol. %) after conversion×gas amount (mL/min) after conversion).]

TABLE 1

| | Specific surface area ($m^2/g$) | CO adsorption amount (mmol/g) | $N_2O$ surface area ($m^2/g$) | CuO crystallite size (Å) | Conversion (%) 200° C. |
|---|---|---|---|---|---|
| Ex. 1 | 158 | 0.051 | 34 | 64 | 32.1 |
| Ex. 2 | 140 | 0.042 | 36 | 97 | 30.5 |
| Ex. 3 | 175 | 0.044 | 36 | 108 | 31.9 |
| Ex. 4 | 137 | 0.055 | 40 | 91 | 41.2 |
| Ex. 5 | 183 | 0.022 | 25 | 60 | 28.9 |
| Ex. 6 | 121 | 0.031 | 29 | 134 | 19.5 |
| Ex. 7 | 132 | 0.034 | 30 | 85 | 25.2 |
| Comp. Ex. 1 | 15 | 0.002 | 5 | 228 | 4.6 |
| Comp. Ex. 2 | 93 | 0.011 | 19 | 340 | 17.9 |
| Comp. Ex. 3 | 48 | 0.009 | 16 | Not observed | 4.9 |
| Comp. Ex. 4 | 111 | 0.023 | 28 | 96 | 5.5 |
| Comp. Ex. 5 | 107 | 0.011 | 22 | 87 | 5.8 |
| Comp. Ex. 6 | 102 | 0.069 | 54 | 32 | 13.2 |

(Note)
Specific surface area: catalyst specific surface area,
$N_2O$ surface area: copper surface area <Evaluation of Catalyst Durability>

Each of the catalysts produced in the Examples and Comparative Examples (particle size: 0.5 to 1 mm) (3 mL) was charged into a quartz reaction pipe having an inner diameter of 16 mm. The catalyst was subjected to reduction treatment in the reaction pipe at 230° C. for two hours under a stream of $H_2/N_2$ (20%/80%). Thereafter, a gas mixture of $H_2/CO/CO_2/H_2O$ (49.9 vol. %/9.9 vol. %/10.2 vol. %/30.0 vol. %) was introduced into the reaction pipe at a GHSV of 2,500 $hr^{-1}$, and CO conversion was carried out at 200° C. for one hour, followed by cooling to 50° C. under purging with water vapor. The catalyst was maintained for one hour after stopping of water vapor supply. A process including CO conversion (200° C., one hour) and cooling to 50° C. was repeatedly carried out. The durability of the catalyst was evaluated on the basis of a tendency toward reduction in catalytic activity due to repetition of the process. Table 2 shows reduction in CO conversion in accordance with the number of repetitions of the process by use of the catalyst of Example 1 or Comparative Example 1.

TABLE 2

| Number of repetitions | Example 1 | Comparative Example 1 |
|---|---|---|
| 0 | 91.4 | 88.5 |
| 10 | 88.4 | 82.3 |
| 30 | 89.3 | 69.4 |
| 50 | 89.6 | 64.1 |

INDUSTRIAL APPLICABILITY

According to the present invention, there can be provided a catalyst precursor substance containing copper, zinc, and aluminum and exhibiting a novel X-ray diffraction pattern; a method for producing the catalyst precursor substance; a copper-zinc-aluminum catalyst which is produced through calcining of the catalyst precursor, and is employed as a catalyst for steam reforming of methanol, a catalyst for methanol synthesis, or a desulfurization catalyst; a copper-zinc-aluminum catalyst produced through calcining of the catalyst precursor and employed as a catalyst for water gas shift reaction, which exhibits high activity and durability and which, even when applied to a fuel cell, can be used for a long period of time with reduction in activity being suppressed; a carbon monoxide conversion method employing the copper-zinc-aluminum catalyst; and a fuel cell system employing hydrogen produced through the carbon monoxide conversion method.

The invention claimed is:

1. A method for producing a catalyst precursor substance, which comprises:
    mixing a solution comprising a copper salt, a zinc salt, and an aluminum salt with a solution comprising an alkali metal hydroxide or an alkaline earth metal hydroxide to form a mixture having a pH of 8 to 11.5, to thereby form a precipitate,
    wherein, in the solution comprising a copper salt, a zinc salt, and an aluminum salt, the atomic ratio Cu/(Cu+Zn+Al) is 0.1 to 0.9, the atomic ratio Zn/Cu is 0.05 to 1.0, and the atomic ratio Zn/Al is 0.05 to 1.5, and
    wherein the catalyst precursor substance comprises copper, zinc, and aluminum and exhibits an X-ray diffraction pattern comprising broad peaks at interplanar spacings d (Å) of 5.0±0.5 Å, 3.7±0.3 Å, 2.6±0.2 Å, 2.3±0.2 Å, and 1.7±0.1 Å.

2. The method according to claim 1, wherein the catalyst precursor substance produced has an X-ray diffraction pattern further comprising broad peaks at interplanar spacings d (Å) of 8.4±0.6 Å and 4.2±0.3 Å.

3. The method according to claim 1, wherein the catalyst precursor substance produced further comprises at least one of the elements belonging to Groups 2 to 14 of the periodic table.

4. The method for producing a catalyst precursor substance according to claim 1, wherein, in the solution comprising a copper salt, a zinc salt, and an aluminum salt, the atomic ratio Cu/(Cu+Zn+Al) is 0.2 to 0.9, the atomic ratio Zn/Cu is 0.1 to 0.9, and the atomic ratio Zn/Al is 0.1 to 1.0.

5. The method for producing a catalyst precursor substance according to claim 1, comprising mixing said solution comprising a copper salt, a zinc salt, and an aluminum salt with said solution comprising an alkali metal hydroxide, wherein the alkali metal hydroxide is sodium hydroxide.

6. The method according to claim 1, further comprising drying and calcining said precipitate to form a copper-zinc-aluminum catalyst.

7. The method according to claim 6, wherein said calcining occurs at 200° C. to 600° C.

8. The method according to claim 7, wherein said copper-zinc-aluminum catalyst has a specific surface area of 50 to 500 m²/g, wherein, when the total amount of catalyst components is 100 mass %, the amount of copper oxide component is 10 to 90 mass %, the amount of zinc oxide component is 5 to 60 mass %, and the amount of aluminum oxide component is 5 to 60 mass %.

9. The method according to claim 7, wherein said copper-zinc-aluminum catalyst has a specific surface area of 100 to 200 m²/g, a copper surface area of 20 m²/g or more, a carbon monoxide adsorption amount of 20 to 100 μmol/g, and a CuO crystallite size of 150 Å or less, wherein, when the total amount of catalyst components is 100 mass %, the amount of copper oxide component is 30 to 90 mass %, the amount of zinc oxide component is 5 to 40 mass %, and the amount of aluminum oxide component is 5 to 40 mass %.

10. The method according to claim 6, wherein said copper-zinc-aluminum catalyst has a specific surface area of 50 to 500 m²/g, wherein, when the total amount of catalyst components is 100 mass %, the amount of copper oxide component is 10 to 90 mass %, the amount of zinc oxide component is 5 to 60 mass %, and the amount of aluminum oxide component is 5 to 60 mass %.

11. The method according to claim 6, wherein said copper-zinc-aluminum catalyst has a specific surface area of 100 to 200 m²/g, a copper surface area of 20 m²/g or more, a carbon monoxide adsorption amount of 20 to 100 μmol/g, and a CuO crystallite size of 150 Å or less, wherein, when the total amount of catalyst components is 100 mass %, the amount of copper oxide component is 30 to 90 mass %, the amount of zinc oxide component is 5 to 40 mass %, and the amount of aluminum oxide component is 5 to 40 mass %.

12. The method according to claim 6, wherein said copper-zinc-aluminum catalyst is a catalyst for water gas shift reaction.

13. The method according to claim 6, wherein said copper-zinc-aluminum catalyst is a catalyst for steam reforming of methanol, a catalyst for methanol synthesis, or a desulfurization catalyst.

14. The method for producing a catalyst precursor substance according to claim 1, comprising mixing said solution comprising a copper salt, a zinc salt, and an aluminum salt with said solution comprising an alkali metal hydroxide.

15. The method for producing a catalyst precursor substance according to claim 1, comprising mixing said solution comprising a copper salt, a zinc salt, and an aluminum salt with said solution comprising an alkaline earth metal hydroxide.

16. The method according to claim 1, further comprising drying said precipitate.

* * * * *